United States Patent [19]

Hengesbach

[11] 4,035,004
[45] July 12, 1977

[54] BALL AND SOCKET CONNECTOR AND COMBINATION THEREOF WITH SPRAY GUN

[76] Inventor: Robert W. Hengesbach, 7886 Munson Road, Mentor, Ohio 44060

[21] Appl. No.: 668,195

[22] Filed: Mar. 18, 1976

[51] Int. Cl.² .......................................... F16L 27/04
[52] U.S. Cl. .................................. 285/166; 285/261
[58] Field of Search ...... 285/261, 166, 163, DIG. 8

[56] References Cited
U.S. PATENT DOCUMENTS

| | | | |
|---|---|---|---|
| 2,564,938 | 8/1951 | Warren | 285/166 |
| 2,890,067 | 6/1959 | Morin | 285/166 |
| 3,475,039 | 10/1969 | Ortloff | 285/261 |

Primary Examiner—Patrick D. Lawson
Attorney, Agent, or Firm—John Harrow Leonard

[57] ABSTRACT

A hollow body has ball and socket connections at its opposite ends, respectively. Each ball has a bore therethrough with its inner end disposed in the body cavity. A flexible imperforate tube is connected at its opposite ends to the balls, respectively, in a manner such that liquids can pass, under positive or negative pressure, through the body cavity and balls without contact with the interior wall of the body cavity and the outer companion surfaces of the balls and their sockets. The tube is curvilinear endwise and the length thereof exposed in the cavity is greater than the distance between the inner ends of the bore of the balls so that it can self-adjust to different rocked positions of the balls relative to each other without substantial change in the cross section of its passage. The balls can be locked individually in various rocked positions.

11 Claims, 9 Drawing Figures

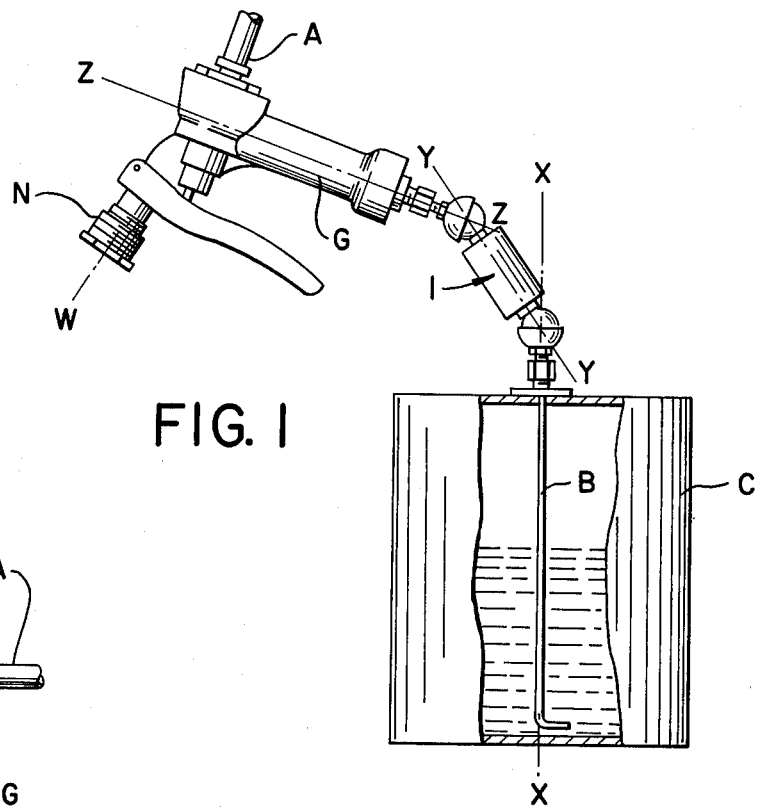
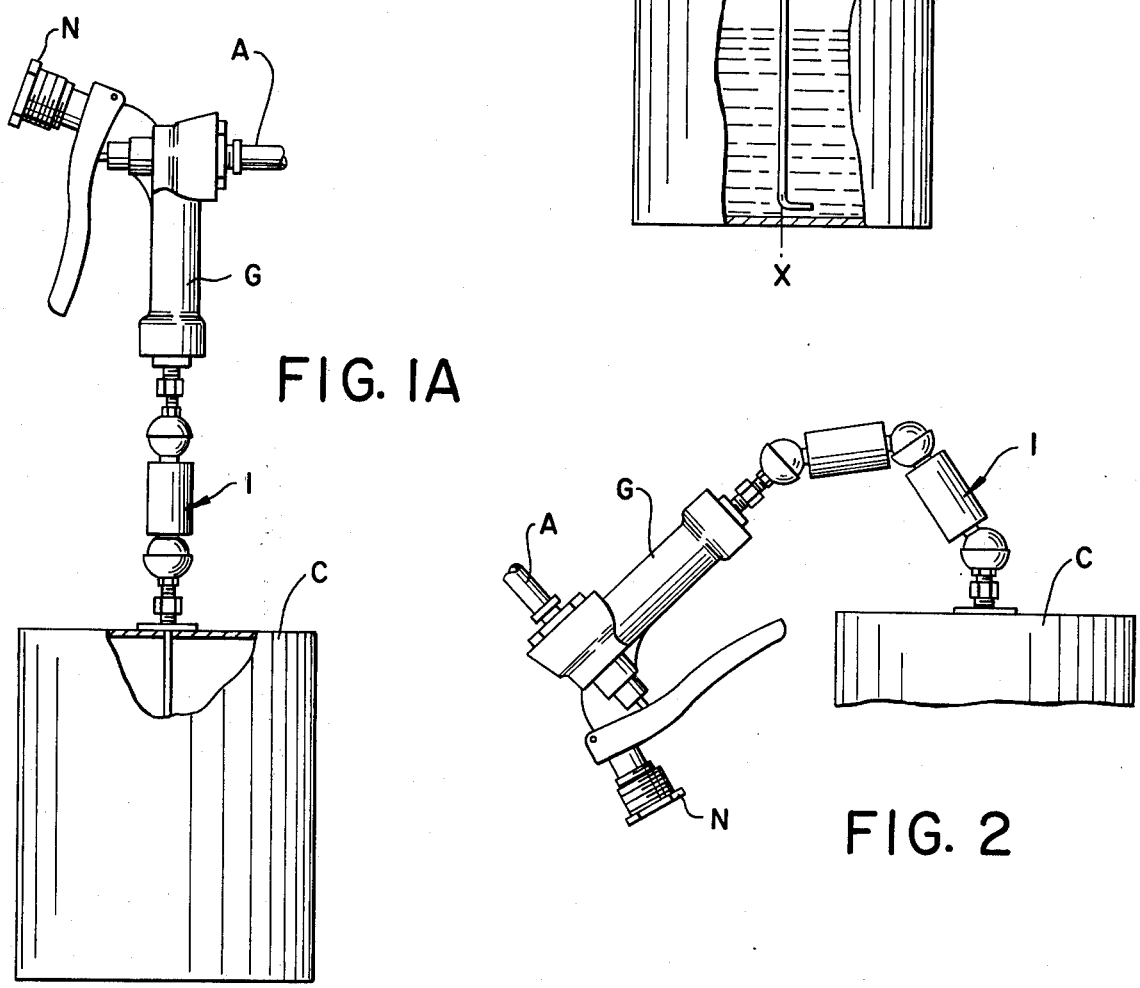
FIG. 1
FIG. 1A
FIG. 2

4,035,004

BALL AND SOCKET CONNECTOR AND COMBINATION THEREOF WITH SPRAY GUN

BACKGROUND OF THE INVENTION

1. Field of the Invention
Ball and socket connectors.
2. Description of Prior Art Ball and socket connectors are well known in the art for connecting two rigid pipes so that they rock to dispose their axes in different angular relations to each other. Generally, the angular adjustment between two conduits connected by a single ball and socket is limited, and in order to afford a wider range of adjustment, a double ball and socket connector is desirable.

For example, in paint spraying operations, it is preferable that the container remain always in upright position to assure a proper supply of paint to the inlet end of the eduction tube. At the same time, it is desirable that the gun be swingable to different positions relative to the upright container so as to discharge in directions which may range from vertically upwardly through horizontal to downwardly. A double ball and socket connector is desirable for this purpose.

In prior ball and socket connections, the complementary surfaces of a ball and its socket are exposed to the liquid passing through the connection. If double ball and socket connections are used, they would be carried by opposite ends of a common hollow body of which the cavity wall also would be exposed to the liquid or paint passing through the joints.

However, if a painting operation is interrupted for too long an interval, the paint in the body of the connector and on the complementary surfaces of the balls and sockets tends to change in consistency, either by partial setting or by settling out of pigment. This can be carried to a degree, depending upon the time interval, which interferes seriously with renewed proper flow of paint through the connector when the operation is recommenced. If the interval of interruption is several hours, the paint in the connector can thicken and set to a degree interfering with the proper rocking of the balls in their sockets. Even with uninterrupted use, the paint-flow tends to localize in a direct stream through the connector, leaving localized areas within the connector cavity in which the paint flow is negligible. The paint, in such localized areas or culs-de-sac, tends to form a thick slurry or sludge which, if somehow dislodged, interferes with or clogs the spray gun nozzle or gives an imperfect spray pattern. Due to these culs-de-sac, the connector cannot be cleaned effectively merely by passing the usual solvent or pigment carrying vehicle and the like through the connector and gun by a spraying operation. Instead, the ball and socket joints must be disassembled, the cavity in the body and the ball and socket parts cleaned, and the connector reassembled and reinstalled.

SUMMARY

In accordance with the present invention, the paint or fluid entering one ball and socket joint is carried therefrom through the body cavity to the other ball and socket joint without coming into contact with the cavity wall, or those surfaces of the balls exposed in the cavity, or the complementary contact surfaces of the balls and their sockets. This is accomplished by a flexible imperforate tube which is so installed relative to both of the balls that no fluid passing through the ball and socket joints can leak into the interior of the cavity or come into contact with the complementary surfaces of the balls and their sockets. The tube is related to the joints so that a smooth walled passage of uniform cross section extends from the outer end of one ball and socket joint to the outer end of the other ball and socket joint, and such passage can be cleaned thoroughly simply by removing the paint container from the gun, attaching a container of solvent or cleaner, and then operating the gun in the usual manner to clean out the eduction tube and connector.

While the invention is shown in connection with a spray gun for the purposes of illustration, its use with other types of devices will be readily apparent from the illustrative example.

BRIEF DESCRIPTION OF THE DRAWINGS

FIG. 1 is a diagrammatic illustration of the use of a connector of the present invention for connecting a spray gun to the paint container, showing one relative operating position of the gun and container;

FIG. 1A is a similar diagram showing a different relative operating position of the gun and container;

FIG. 2 is a diagram similar to FIG. 1, but showing the use of two connectors connecting a spray gun so as to afford a greater range of operating positions;

DESCRIPTION OF THE PREFERRED EMBODIMENTS OF THE INVENTION

The connector, indicated generally at 1, is shown as connecting an upright paint container or tank C and a spray gun G having a discharge nozzle N. an air pressure inlet A, and an eduction tube B, the inlet end of which is near the bottom of the container C. As illustrated in FIG. 1, with the container C upright, the connector 1 may be disposed at an angle up to 35° to 45° to the upright axis X of the tank. The axis X of the tank intersects the longitudinal axis, indicated at Y, of the connector up to an angle of 35° to 45°. The axis Y of the container 1 may be disposed up to an angle of 35° to 45° to the axis Z of the gun inlet, thus disposing the axis Z at an angle of about 20° to the horizontal. Generally, in such guns, the direction of discharge, or axis of discharge, as indicated at W, is at 90° or some other preselected abrupt angle to the inlet axis Z. Thus, it is seen from FIG. 1, that the gun spray may be directed downwardly at about 70° to 90° to the horizontal. Further, the gun may be rotated about the axis Z so as to be directed at the same angle upwardly, and in innumerable directions in between these extremes while the connector 1 retains the position illustrated. On the other hand, as illustrated in FIG. 1A, the connector 1 may be disposed with its axis upright and coincident with the upright axis of the container C, with the gun G disposed with its inlet axis Z upright, so that the discharge of the gun is horizontal. In this position of the connector 1, the gun can be rotated about its upright axis or tilted, as desired.

In these two illustrations, it is apparent that an infinite number of angular adjustments of the direction of discharge of the gun relative to the upright axis of the container C can be obtained. This is of special advantage, for example, in reaching around and spray painting the underside and inside of automobile fenders and the like.

By adjusting the connector 1 so as to give the desired angularity between the axis X of the container C and the axis Z of the gun, and locking the tank and gun fixedly in the adjusted position selected, the gun can be used conveniently for spraying parts that otherwise would be difficult to reach.

By using two connectors, as illustrated in FIG. 2, adjustment of the direction of discharge of the gun is greatly increased.

Figure 3:
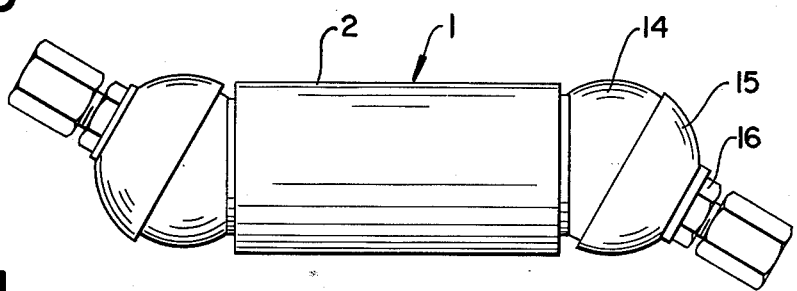
FIG. 3 is an enlarged side elevation of a connector embodying the principles of the present invention.
Figure 4:
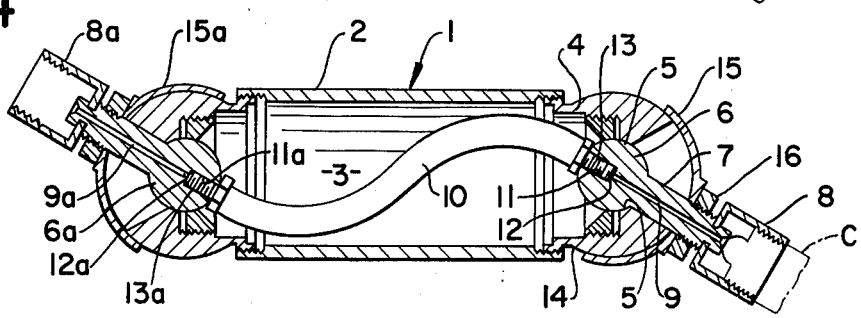
FIG. 4 is a longitudinal sectional view of the connector illustrated in FIG. 3, the internal tube connecting the balls and sockets being shown in elevation for clearness in illustration.

Referring particularly to FIGS. 3 and 4, the connector 1 comprises a body 2 having a cavity 3, and provided at its ends with ball and socket joints, respectively. Since the ball and socket joints at the ends are identical, the parts of the only one are described in detail, and like parts of the other are designated by like reference numerals with the suffix a.

Referring to the right hand end of the connector 1, the cavity 3 of the body 2 is closed by suitable detachable cap or plug 4 which has a socket 5 which cooperates with a complementary ball 6.

The ball 6, at its outer end, has an external neck 7 which carries an internally screw-threaded rotatable connector 8 which can be threadably connected to a conventional complementary connector on the container C, or other conduit or device, as may be desired.

Figure 5:
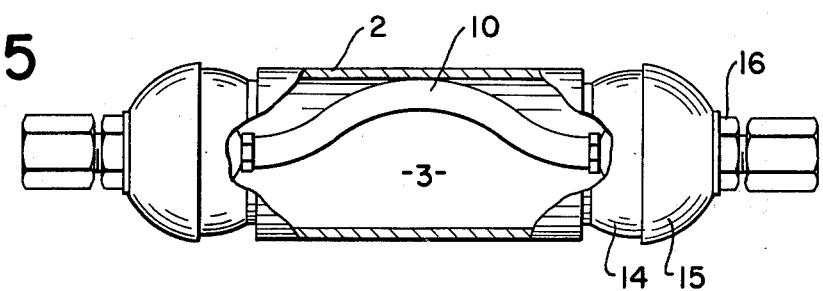
FIG. 5 is a view similar to FIG. 3 showing the balls adjusted for axial alignment of their bores with each other, part of the body being broken away for clearness in illustration.

The ball 6 and its neck 7 have a through bore 9 which, at its inner end, is connected to a flexible imperforate tube 10. The tube 10 may be of elastomeric material, or woven impregnated wire, or the like which may be reversely bent into a serpentine shape, as illustrated in FIG. 4, or bowed, as illustrated in FIG. 5, without reducing the cross section of the passage therethrough. The ends of the tube 10 are connected to the inner end of the balls, respectively, in sealed relation to the inner ends of the associated bores 7 so that fluid flowing through the balls is constrained to pass through the tube 9 without escaping into the space between the complementary surfaces of the ball and its socket and without escaping into the cavity 3. The tube may be connected to the balls in any conventional manner, such as being cemented into the bores of the balls 6, or detachably fastened therein, as illustrated in FIG. 4. In the latter instance, the ball 6, at the inlet end of its bore 9, is provided it an enlarged internally threaded counterbore 11 coaxial with the bore 9, and terminating at a seating shoulder 12 interposed between the counterbore 11 and the bore 9 at their juncture. Threadably received in the bore 11 is a fitting 13. The tube 10 is seal connected to the fitting and the fitting is seal connected to the ball in any conventional manner.

Figure 6:
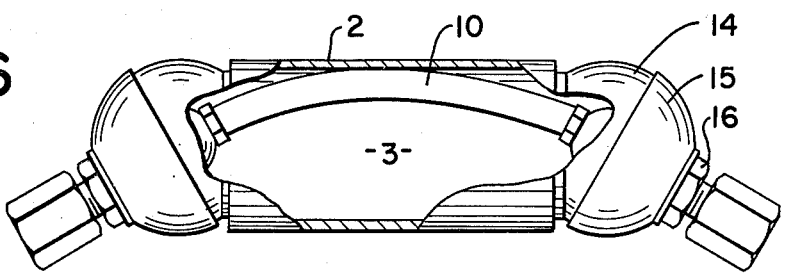
FIG. 6 is a view similar to FIG. 3 showing a different relatively adjusted position of the balls.
Figure 7:
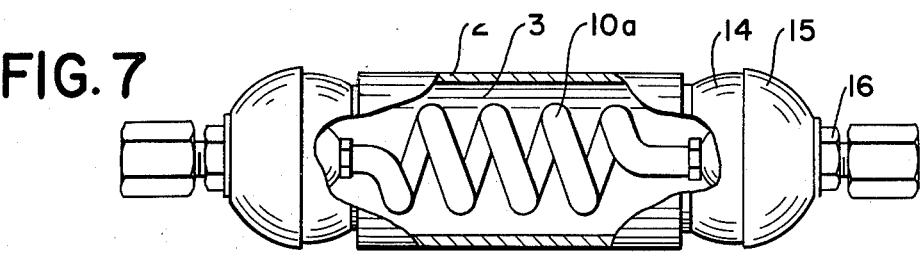
FIG. 7 is a view similar to FIG. 5 illustrating a modified curvilinear shape of the tube of the connector.

It is to be noted that the length of the portion of the tube 10 between the inner ends of the balls 6 is greater than the shortest distance between the inner ends of the balls 6, as when their bores 9 are coaxial. The diameter of the cross section of the cavity 3 is preferably several times larger than the outer diameter of the tube 10. As a result, the portion of the tube between the balls can shift radially in the cavity and assume serpentine form, as illustrated in FIGS. 4, or bowed forms, as illustrated in FIGS. 5 and 6, respectively, as it accommodates itself to the angular disposition of the axes of the bores 9 of the balls 6 and 6a. Again, the tube may be in helical form, as indicated at 10a in FIG. 7, to provide the necessary curvilinear shape for compensating for different angularities of the passages 9 and 9a of the balls. The bends in the tube remain sufficiently gradual so as not to change appreciably the cross section of the passage in the tube 10. As a result, the connector provides a smooth wall passage of uniform cross section through the body in all adjusted positions of the balls 6.

It is desirable not only that the individual ball and socket joints be adjustable, but also that means be provided for holding them in their adjusted positions so that the gun can be presented in the proper position for reaching the selected surface to be painted while the container remains sufficiently near upright to function properly and without spillage. For this purpose, and as illustrated in FIG. 4, the cap or plug 4 has a large external spherical head 14 which is concentric with the socket 5. A combined shield and clamp 15 is mounted on the neck 7 for sliding axially thereof. The inner wall of the shield is about hemispherical and concentric with the head 14. While shielding the ball and socket from external contaminants, it can be forced into clamping engagement with the head 14, and thereby draw the ball into a tight seated relation to its socket, by means of a lock nut 16.

It is apparent from the foregoing that a through passage of substantially the same diameter throughout its length is obtained, the passage through the tube being, in effect, a continuation of the bores 9. Depending on the overall size permitted by the installation in which it is used, the diameter of the ball, the size of its bore, and the external and internal diameter of the tube can be selected so that the effective diameter of the tube passage is equal to, greater than, or less than the diameter of the conducting portion of the bore of the ball and its neck beyond the counterbore portion of the ball bore in which the tube and fitting are connected.

The tube flexes properly without any appreciable change in the cross section of the tube 10, so that a free flow directly into and from one ball to and outwardly from the other is provided, while the material flowing is isolated entirely from the interior of the cavity 3.

Figure 8:
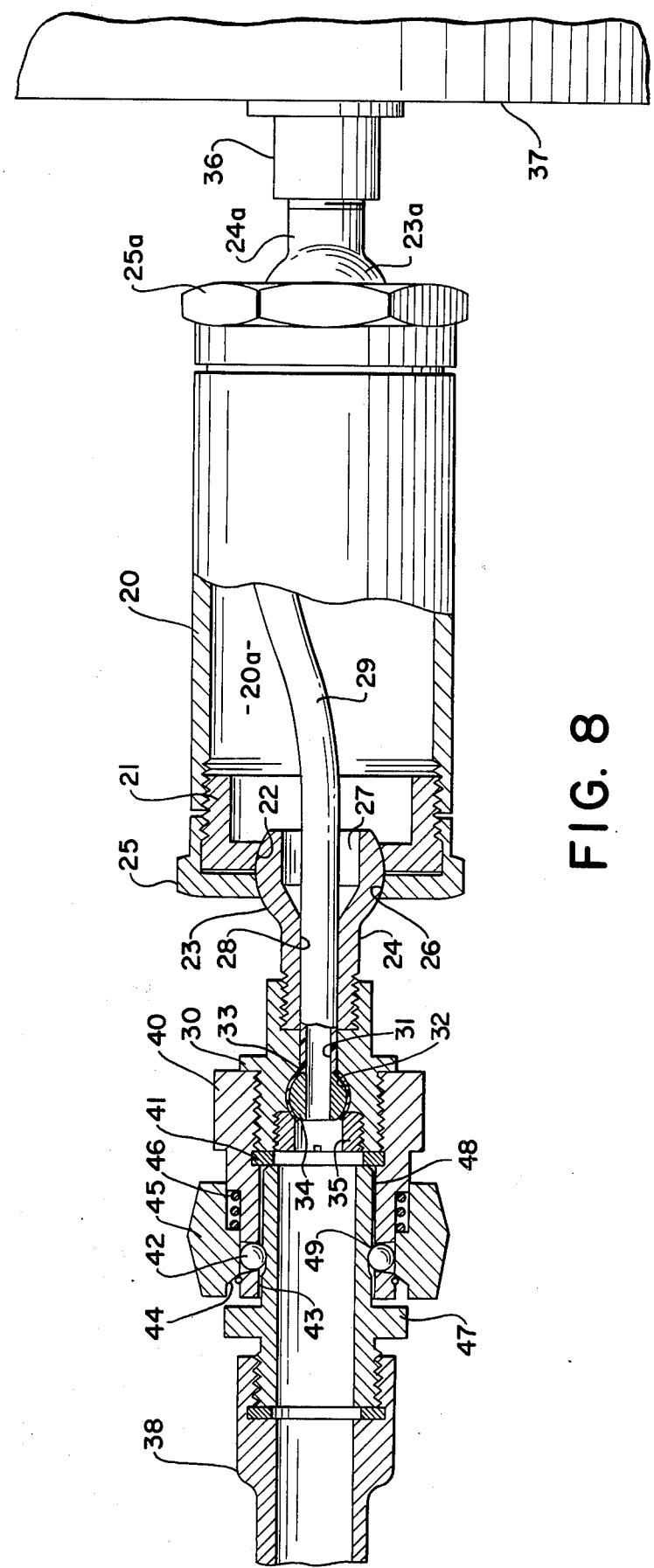
FIG. 8 is an enlarged fragmentary longitudinal sectional view, partly in elevation, of a modified connector and part of a spray gun, illustrating another modified form of the connector, part of a spray gun being shown connected thereto, showing another manner of mounting the tube in the ball and a swivel connection between the connector and gun.

Referring to FIG. 8, a modification which functions similarly to that heretofore described is illustrated. As there illustrated, the connector comprises a hollow sleeve or body 20, having a cavity 20a. The ends of the body are provided with ball and socket joints, respectively. Since these joints are identical, only the parts of the one on the left end of the body are referred to in detail, the corresponding parts of the joint on the right end of the body being designated by like reference numerals with the suffix a. In the left end of the body is a plug 21 having an outwardly concave spherical socket seat 22 against which a ball 23 seats to prevent its being moved inwardly axially of the body 20. The ball 23 has a neck 24 threaded for connection to an external fitting. A clamping cap 25 is threadably connected to the plug 21 and has an inwardly concave spherical socket seat 26 which seats against the ball to prevent the ball from moving outwardly from the body. The seats 22 and 26 provide a socket which normally fits the ball with operating clearance so that the ball can be rocked to adjusted positions about its center. The plug 21 and cap 25 can be drawn together to clamp the ball in selected adjusted positions, when desired, merely be tightening the cap 25.

The ball 23 has an internal cavity 27 which opens at the inner end of the ball and, at its opposite end opens into an axial bore 28 in the neck 24.

A flexible imperforate tube 29, of suitable plastic composition, extends through the body 20. An end portion of the tube 29 extends through the cavity 27, and through the bore 28 with a slip fit, and protrudes at its outer end beyond the outer end of the neck 24. The neck 24 is threadably connected to a fitting 30 having a bore 31 and a coaxial communicating bore 32 of larger diameter than the bore 31 and thereby providing a shoulder 33 between the bores. The protruding end of the tube 29 is fitted with an internal annular reinforcing annulus or expander 34 and is engaged on its outer surface by a companion threaded collar 35 by which the end of the tube is clamped against the shoulder 33 in seal fitting relation. Consequently, liquid can pass into and out of the tube 29 to any device to which it is to be supplied without escaping into the body cavity 20a or onto the companion mating surfaces of the ball 23 and socket seats 22 and 26.

As mentioned, the parts at the opposite end of the body 20 may be identical with those above described, except insofar as a fitting 36, comparable to the fitting 30, may be modified for connection to a different device with which the connector is to be associated.

For example, the tube 29, at its opposite end, may extend beyond the annular expander 34a and collar 35a and through the fitting 36 so that its open end will be disposed at the bottom of a container 37 to which the fitting 36 is attached.

In FIG. 8, the left end of the connector is connected to a spray gun, indicated at 38. Since, in some cases, it may be desirable to rotate the gun about the axis of its inlet, and hence about the axis of the neck 24 and fitting 30, while the ball is clamped in fixed position in its socket, a quickly detachable swivel connection may be provided between the fitting 36 and the gun 38. The swivel connection may be a conventional one comprising a sleeve 40 which is threadably connected to the outer end of the fitting 30. A washer 41 provides a seal between a shoulder in the sleeve 40 and the outer end of the fitting 30. The sleeve 40 carries a plurality of radially movable detents 42 which are movable into an axial connecting bore 43 in the sleeve 40 by a cam 44 carried by an external annulus 45 which is spring biased by a spring 46 to a position to hold the detents in locking position wherein they protrude into the bore 43.

A complementary connector part 47, threaded at its outer end for connection to the gun 38, is detachably connected to the sleeve 40 by the detents 42. For this purpose the part 47 has a neck 48 which has an annular locking shoulder 49 behind which the detents can engage for holding the part 47 connected to the sleeve 40. The shoulder 49 is positioned endwise of the neck 48 a distance such that the end of the neck 48 is in pressure seated sealing contact with the washer 41 when the shoulder 49 abuts the detents 42. The outer surface of the neck 48, near its inner end, is bevelled so that upon insertion of the neck it cams the detents 42 radially outwardly out of the path of the neck while the annulus 45 is being held to right, against the bias of the spring 46. Upon release and return of the annulus 46, to the left, by the spring 46, the cam 44 biases the detents radially inwardly so that, if the neck is fully inserted, they are moved behind the shoulder 49 and secure the part 47 in connected relation to the sleeve 40, and hence to the connector.

While the form of the invention used for purposes of illustration shows the sockets in the body and the balls connected to extraneous equipment, obviously the ball and socket joints can be reversed, the balls being rigid with the body and the sockets connected to the extraneous equipment.

Having thus described my invention, I claim:

1. A fluid conducting bell and socket connector comprising:
   a ball and socket joint, including a ball member and a socket member having complementary concentric spherical contact surfaces, respectively, and holding means holding the members together, with said surfaces in slip fitting contact relation with each other, for rocking of the members relative to each other about the common center of said surfaces;
   said socket member having a central passage therethrough;
   said ball member, in connected condition, having a first portion seated in said socket at on side of said contact surface of the socket and having a second portion exposed for access, for the opposite side of said socket surface, through said central passage;
   said ball having a through passage which extends from said one portion through the other portion and which is open at its opposite ends;
   a flexible imperforate fluid conducting tube connected to the ball member and constraining fluid passing through the joint from access to said complementary surfaces; and
   complementary clamping means, in addition to said holding means, connected to the members and manually operable to clamp the members securely in selected relatively rocked positions.

2. The structure according to claim 1 wherein a rigid support, having a passage therein, is provided;
   one of the members is connected in fixed position to said support;
   said tube has a portion which extends through the passage in the support and said portion has an open outer end spaced from the joint; and
   means are provided on said support for connecting it to a source of fluid with said open outer end of said portion of the tube in communication with said source.

3. The structure according to claim 1 wherein an external fitting is connected to the ball member and is adapted for connection to an extraneous device in which fluid is to flow and the fitting has a passage therein; said tube extends entirely through said passage of the ball member, beyond the outer end thereof, and into the passage of the fitting; and means connect the tube in the fitting with the tube periphery in sealed relation to the fitting.

4. A fluid conducting ball and socket connector comprising:
   a hollow supporting body, a first ball and socket joint carried on the body and including a ball member and a socket member having complementary concentric spherical contact surfaces, respectively;

holding means holding the members together with said surfaces in slipt fitting contact relation with each other, for rocking of the members relative to each other about the common center of said surfaces;

said socket member having a passage therethrough;

said ball member, in connected condition, having a first portion seated in said socket at one side of said contact surface of the socket and having a second portion exposed for access, from the opposite side of said socket surface, through said central passage;

said ball having a through passage which extends from said one portion through the other portion and which is open at its opposite ends;

a flexible imperforate fluid conducting tube in the body and connected to the ball member and constraining fluid passing through the joint from access to said complementary surfaces and to the interior of the body;

complementary clamping means, in addition to said holding means, connected to the members and manually operable to clamp the members securely in selected relatively rocked positions;

a second ball and socket joint carried on the body, in spaced relation to the first ball and socket joint, and including a second ball member and a second socket member, which members of the second joint have complementary concentric spherical contact surfaces, respectively;

second holding means holding the second members together, with their complementary surfaces in slip fitting relation to each other;

said second socket member having a passage therethrough;

said second ball member, in connected condition, having a passage therethrough; and said portion of the tube is connected to said second ball member and constrains fluid passing through said second joint from coming in contact with the complementary surfaces of the second joint and with the interior of the body.

5. The structure according to claim 4 wherein another like connector having two and socket joints is provided, and said connectors are connected in series with each other at adjacent ends, whereby adjustability in the positions of the devices attached to the other ends of the connectors, respectively, relative to each other, is increased.

6. The structure according to claim 4 wherein the tube is constructed and arranged to be operative to conduct fluids freely through said joint in all adjusted positions of said joint.

7. The structure according to claim 6 wherein the length of the portion of the tube between the ball members is materially greater than the distance between the ball members.

8. The structure according to claim 7 wherein said portion of the tube between the ball members is curvilinear endwise, and the length of said portion and its external diameter are so related to the length and the cross section of the interior of the hollow body that the tube can flex into different profiles therein, without reduction of its normal internal cross section, as the joints are rocked to different positions.

9. The structure according to claim 8 wherein said portion of the tube between the ball members is helical.

10. The structure according to claim 4 wherein clamping means in addition to said holding means are provided for each ball an socket joint and are arranged externally of the body and each clamping means is manually operable to clamp its associated ball and socket members selectively in rocked positions relative to each other.

11. The structure according to claim 4 wherein connecting elements are provided on the ends of the tube, respectively, and complementary connecting means for the elements are provided on the ball members, respectively, and are operative to detachably connect the ends of the tube from their associated ball members, relatively.

* * * * *

UNITED STATES PATENT AND TRADEMARK OFFICE
CERTIFICATE OF CORRECTION

PATENT NO. : 4,035,004
DATED : July 12, 1978
INVENTOR(S) : Robert W. Hengesbach

It is certified that error appears in the above-identified patent and that said Letters Patent are hereby corrected as shown below:

Col. 3, line 32, cancel "the" (second occurrence); line 53, for "bores 7" read --bores-9--; line 55, for "tube 9" read --tube 10--; line 62, for "it" read --with--.
Col. 4, line 9, for "FIGS" read --FIG.--;
Col. 6, line 5, for "annulus 46" read --annulus 45--.
Col. 6, Claim 1, line 1, for "bell" read --ball--.
Col. 7, line 6, for "slipt" read --slip--.
Col. 8, line 5, for "and" read --end--.
Col. 8, Claim 10, line 34, after "members" read --securely--.

Signed and Sealed this

Twentieth Day of June 1978

[SEAL]

Attest:

RUTH C. MASON
Attesting Officer

DONALD W. BANNER
Commissioner of Patents and Trademarks